Patented May 2, 1939

2,156,936

UNITED STATES PATENT OFFICE 2,156,936

PREPARATION OF HEXENE FROM DIVINYL-ACETYLENE

William Stansfield Calcott, Woodstown, N. J., Albert S. Carter, Wilmington, Del., and Frederick B. Downing, Carneys Point, N. J., assignors to E. I. du Pont de Nemours & Company, Wilmington, Del., a corporation of Delaware No Drawing. Application July 22, 1937, Serial No. 154,998

3 Claims. (Cl. 260—683)

This invention relates to the production of n-hexene-3, more particularly it relates to the partial hydrogenation of divinylacetylene to produce n-hexene-3.

It is known that divinylacetylene may be reduced with hydrogen in the presence of a hydrogenation catalyst to produce compounds having a higher degree of saturation. U. S. Pat. No. 1,903,501, issued April 11, 1933 to Calcott, Carter and Downing, describes broadly a process for carrying out the catalytic reduction of divinylacetylene with hydrogen. This patent does not disclose a method of controlling the hydrogenation so as to selectively produce n-hexene-3 in good yield.

It is an object of this invention to produce n-hexene-3 from divinylacetylene in good yield. Further objects will appear hereinafter.

These objects have been accomplished by reacting divinylacetylene with hydrogen, employing a catalyst which consists of active nickel, preferably on kieselguhr. With the type of catalyst employed and under the conditions herein described, the reduction proceeds easily until three mols of hydrogen are reacted per mol of divinylacetylene originally present, after which little or no further reaction is observed, and it may be said that the reaction practically ceases. There is practically no reduction to the completely saturated compound hexane. In addition to the principal product of the reaction n-hexene-3, small negligible quantities of other reduction products, such as hexadienes, hexatriene and divinylacetylene polymers are also formed. The hydrogenation of divinylacetylene in the presence of an active nickel catalyst may be expressed by the equation

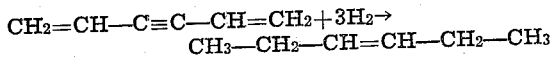

It is understood, of course, that the reaction may take place in progressive stages although only negligible quantities of intermediate products are found at the end of the reaction.

The following examples are given in order to afford a more complete understanding of the invention. It is to be understood that these examples are supplied by way of illustration only.

Example I

Hydrogenation under superatmospheric conditions is performed in a steel autoclave equipped with efficient agitation (80 to 150 R. P. M.) and thermometer well, a safety disk, charging hole and suitable fittings for the introduction of measured quantities of hydrogen under pressure. The autoclave is placed in a water bath, the temperature of which can be controlled in any known manner. The hydrogen gas line is connected with a hydrogen storage tank which is so fitted that the entire system can be evacuated or charged with nitrogen. The storage tank is charged from cylinders of commercial hydrogen. Consumption of hydrogen is readily measured and observed by the drop of pressure in the storage tank as the reaction proceeds in the autoclave. With the storage system under 300 to 1000 pounds of hydrogen pressure and the air in the autoclave displaced by nitrogen, 1560 parts of divinylacetylene, which has been purified by repeated fractional distillation, are introduced into the autoclave together with 75 parts of active nickel on kieselguhr (30 to 40% nickel). The autoclave is then closed and the system is evacuated and charged with hydrogen, the pressure of which is maintained between 100 and 150 pounds. Agitation is started and the water bath is slowly raised to about 35° C. The reaction begins when the inside temperature range is about 35 to 40° C. Once started, the reduction process proceeds quite rapidly. After three or four hours, it slows up considerably until no further reaction is noted. It requires approximately six to nine hours for the addition of 120 parts of hydrogen (7.7 parts of $H_2$ per 100 parts of divinylacetylene or three mols of $H_2$ per mol of divinylacetylene). The completed reduction product is then cooled, the excess hydrogen removed and the contents of the autoclave are filtered to remove the catalyst and distilled to eliminate polymeric bodies formed from the divinylacetylene. An 80 to 85% yield of high grade n-hexene-3 is obtained.

Example II

The process of Example I is repeated using as the raw material crude divinylacetylene obtained from the polymerization of acetylene. In this embodiment, the crude product from the autoclave is directly steam distilled, thereby obtaining a water white olefin which is free from catalyst and free from polymers. As is to be expected, the yield of n-hexene-3 is lower than that obtained from pure divinylacetylene.

Example III 100 parts of divinylacetylene are dissolved in an equal volume of hexene-3 and 5 parts of active nickel catalyst on kieselguhr are added. The mixture is placed under a pressure of 100 to 150 pounds of hydrogen and heated to about 70° to 75° C. with agitation as in Example I. The reaction proceeds until approximately 7.5 to 7.7 parts by weight of hydrogen have been added. The mixture is steam distilled and the distillate fractionated, giving a high yield of good quality n-hexene-3.

The catalyst for this reaction is active nickel either unsupported or on a suitable support. For example, a satisfactory catalyst may be prepared by precipitating nickel hydroxide or nickel carbonate on kieselguhr and igniting in an atmosphere of hydrogen by well known methods. A catalyst thus supported may contain from 10 to 40% nickel. The amount of catalyst used may be varied. When carrying the process out as a batch reaction, it is preferred that the weight ratio of catalyst to divinylacetylene be between 0.007 and 0.03. Higher catalyst concentrations give more rapid reaction but are uneconomical. (The weight of the catalyst as here expressed includes the metallic nickel only.)

The reaction takes place over a temperature range of 35 to 85° C. when the pressure is between 100 and 150 pounds of hydrogen. It is preferred to carry on the reaction at a temperature of about 70° to 75° C.

While the preferred pressure range is 100 to 150 pounds per square inch of hydrogen, the process is operative over a wider range of pressure, varying from 15 to 750 pounds per square inch. It is to be understood that when operating the process outside of the preferred pressure range, the temperature should be adjusted accordingly.

The process may be carried on without agitation but agitation accelerates the rate of reaction and hence it is preferred that an agitator be used. The speed of the agitator will vary with the type of apparatus used.

The process may be conducted as a continuous operation; for example, by feeding hydrogen, catalyst and divinyl-acetylene under pressure through a coil, the temperature of which is thermostatically controlled and continuously removing the product of the reaction from the system.

The process may be carried out in the absence of a solvent as illustrated in Examples I and II. It may also be carried out in the presence of a solvent as illustrated in Example III. Suitable solvents are acetone, alcohols, ether, ethyl acetate, hexene-3 and hydrocarbons such as benzene, toluene and xylene.

It would be logical to expect the hydrogenation of divinylacetylene to proceed until hexane was produced as the final product. This does not appreciably occur, however, but reaction practically ceases after the formation of n-hexene-3 with only negligible amounts of hexane being produced under the reaction conditions herein described using nickel as a catalyst. Moreover, if the reaction is stopped before completion, it is found that the reaction mass contains primarily a mixture of n-hexene-3 and unreacted divinylacetylene. While a theoretical explanation for the unexpected behavior of the reactants under the conditions herein described is not attempted, nevertheless, the process of the invention affords a very useful method for the production of n-hexene-3 in good yield and at low cost.

The n-hexene-3 produced by this process has a boiling range of 66° to 67° C. at atmospheric pressure, a refractive index of $$N_D^{25} = 1.3920 \text{ to } 1.3940$$

a sp. gr. of $$D_{20}^{20} = 0.6788 \text{ to } 0.6820$$

iodine number of 290 to 300, and one sample gave a composition of 85% carbon and 13.2% hydrogen by analysis. The n-hexene-3 here produced adds bromine to form 3,4-dibromo-hexane. When treated with sulfuric acid, the n-hexene-3 of this process yields a sulfuric ester which is hydrolyzed by water to give hexanol-3.

n-Hexene-3 is a very reactive olefin which can be readily condensed with phenols and aromatic hydrocarbons to produce alkylated products which are suitable for use as dye intermediates, as bactericides, as gum inhibitors, as rubber antioxidants and as intermediates for the production of washing, wetting and emulsifying agents for textiles and rubber.

Suitable changes may be made in the details of the process without departing from the spirit thereof and such changes are intended to be included within the scope of the appended claims.

We claim:

1. The process of preparing n-hexene-3 which comprises reacting under nonoxidizing conditions, divinylacetylene with an excess of hydrogen in the presence of a catalytic amount of active nickel at a temperature between 35° and 85° C. until the reaction practically ceases and separating n-hexene-3 from the reaction mass.

2. The process of preparing n-hexene-3 which comprises reacting divinylacetylene with hydrogen by agitating liquid divinylacetylene in an atmosphere of hydrogen, under a pressure of 100 to 150 pounds per square inch, at a temperature of about 70° to 75° C. in the presence of a catalytic amount of nickel on kieselguhr until substantially 3 mols of H₂ per mol of divinylacetylene has been consumed and isolating n-hexene-3.

3. The process of preparing n-hexene-3 which comprises reacting divinylacetylene with hydrogen by dissolving 100 parts of divinylacetylene in a solvent therefor, adding 0.7 to 3.0 parts of a catalyst of active nickel on kieselguhr, agitating the solution in an atmosphere of hydrogen at a temperature of about 35° to 85° C. until the reaction practically ceases, and isolating n-hexene-3.

WILLIAM S. CALCOTT.
ALBERT S. CARTER.
FREDERICK B. DOWNING.

CERTIFICATE OF CORRECTION.

Patent No. 2,156,936. May 2, 1939.

WILLIAM STANSFIELD CALCOTT, ET AL.

It is hereby certified that error appears in the printed specification of the above numbered patent requiring correction as follows: Page 2, second column, line 39, claim 1, after "nickel" insert the words and comma on kieselguhr, under a pressure of 100 to 150 pounds per square inch,; and that the said Letters Patent should be read with this correction therein that the same may conform to the record of the case in the Patent Office.

Signed and sealed this 20th day of June, A. D. 1939.

(Seal) Acting Commissioner of Patents.
Henry Van Arsdale